UNITED STATES PATENT OFFICE.

CARL SUNDSTROM, OF SYRACUSE, NEW YORK, ASSIGNOR TO THE SOLVAY PROCESS COMPANY, OF SOLVAY, NEW YORK, A CORPORATION OF NEW YORK.

PROCESS OF OBTAINING SODIUM BICARBONATE FROM ALKALINE WATERS.

1,349,447.     Specification of Letters Patent.     Patented Aug. 10, 1920.

No Drawing. Original application filed October 16, 1918, Serial No. 258,459. Divided and this application filed April 3, 1920. Serial No. 370,966.

*To all whom it may concern:*

Be it known that I, CARL SUNDSTROM, a citizen of the United States, residing at Syracuse, in the county of Onondaga and State of New York, have invented a new and Improved Process of Obtaining Sodium Bicarbonate from Alkaline Waters, of which the following is a specification.

My invention relates to the treatment of natural alkaline waters, such as those of Searles Lake, in California, in which sodium carbonate as $Na_2CO_3.10H_2O$ is contained together with other salts the principal of which are potassium chlorid, sodium chlorid, sodium sulfate and borax and the object of my present improvements is to provide for the recovery in a simple and efficient manner of the sodium carbonate content of such waters in the form of sodium bicarbonate of commercially pure quality.

In carrying my invention into effect I first chill the brine to a low temperature, that which I find most suitable being $-14°$ C, though I do not limit my invention to the use of this exact temperature. By such chilling about two thirds of the borax and sodium carbonate content of the brine and 80 to 90 per cent. of the sodium sulfate are precipitated while the potassium chlorid and sodium chlorid remain in solution.

Such extreme chilling precludes natural refrigeration in localities where such temperatures prevail as in the vicinity of Searles Lake and therefore artificial refrigeration must ordinarily be resorted to. This moreover, is preferable not only because of its greater intensity but because it can be regulated and controlled and is not subject to the variability of the weather. The chilling may be effected in cone bottom tanks containing cooling coils inside of which liquid ammonia is evaporating.

The precipitated salts settle to the bottom of the cone and are drawn off and separated in the cold from the liquor by means of a filter wheel or other suitable device.

The precipitated salts are then heated, or allowed to warm up, to about 25° C. whereby they are partially melted.

The liquor resulting from this contains upward of 100 grams per liter $Na_2CO_3$ together with sodium borate, while the sodium sulfate remains unmelted.

The carbonate containing liquor is filtered from the solid salts at about 25° C. and is then treated to convert the sodium carbonate into bicarbonate, as by being blown with gas containing carbon-dioxid, such as kiln gas or in any other usual or suitable manner, whereby sodium bicarbonate is precipitated which, after separation from the liquid, may be washed, filtered and calcined to yield soda ash.

The hereinbefore described process is briefly described in an application for Letters Patent filed by me October 16, 1918, Serial No. 258,459, of which this present application is a division.

Having thus described my invention what I claim as new and desire to secure by Letters Patent is:—

1. The process of recovering sodium bicarbonate from alkaline brines containing sodium carbonate, which consists in chilling the brine to such temperature below zero centigrade as to cause the precipitation of sodium carbonate and separating the precipitated salts from the liquor; warming the precipitated salts so as to melt the sodium carbonate; separating out the unmelted portion of the salts and carbonating the cleared liquor to precipitate sodium bicarbonate and separating out the sodium bicarbonate.

2. The process of recovering sodium bicarbonate from alkaline brines containing sodium carbonate, borax and sodium sulfate which consists in chilling the brine so as to cause the precipitation of sodium carbonate, borax and sodium sulfate and separating the precipitated salts from the liquor; warming the precipitated salts to melt the sodium carbonate and borax while leaving the sodium sulfate unmelted; separating out the unmelted portion of the salts and carbonating the cleared liquor to precipitate sodium bicarbonate and separating out the sodium bicarbonate.

In testimony whereof I affix my signature this 1st day of April, 1920.

CARL SUNDSTROM